United States Patent [19]

Rife

[11] 4,228,936
[45] Oct. 21, 1980

[54] TIRE AND TOOL CARRIER

[76] Inventor: Orin S. Rife, Rte. 1, Elkland, Miss. 65644

[21] Appl. No.: 66,566

[22] Filed: Aug. 15, 1979

[51] Int. Cl.³ .......................... B60R 9/00; B60R 27/00
[52] U.S. Cl. ............................... 224/42.23; 224/42.13; 224/42.41; 414/463
[58] Field of Search ................. 224/42.23, 42.2, 42.2, 224/42.21, 42.41; 296/37.2, 37.3; 414/463, 465, 466

[56] References Cited

U.S. PATENT DOCUMENTS

| | | | |
|---|---|---|---|
| 1,234,646 | 7/1917 | Feilcke | 224/42.23 |
| 2,034,834 | 3/1936 | Robinson, Jr. | 414/463 |
| 2,063,092 | 12/1936 | Groden | 414/463 |
| 2,578,466 | 12/1951 | Ek et al. | 224/42.23 |
| 3,365,084 | 1/1968 | Fernicola | 224/42.13 X |
| 3,682,360 | 8/1972 | Fletcher et al. | 224/42.05 |
| 3,904,093 | 9/1975 | Hanela | 224/42.21 |
| 4,087,032 | 5/1978 | Miller et al. | 224/42.41 X |
| 4,174,797 | 11/1979 | Yasue et al. | 414/463 X |

Primary Examiner—Steven M. Pollard
Attorney, Agent, or Firm—Glenn K. Robbins

[57] ABSTRACT

A tire and tool carrier for trucks and the like. The carrier is in the form of a box-like support which is supported under the frame of a truck. It is comprised of a stationary box-like base to which is hinged a rear cover or door. The hinge point is to the rear of the mid-point of the tire in order that the tire may be tipped or moved. A floor of the cover has an arcuate tire positioning flange-like rim which serves to position the tire and also provides corner spaces at the rear and side walls of the cover to provide a storage area for tools. The cover provides a security protection to lock the tire and tools in a completely enclosed and restricted area. A spring means is provided as an assist to the cover in closing it from the open position after the tire is removed.

7 Claims, 6 Drawing Figures

TIRE AND TOOL CARRIER

SUMMARY OF THE INVENTION

In the past there has been a problem in providing for storage for tires and tools in conventional pickup trucks and other vehicles. Because of the open nature of a pickup truck bed tires which are supported on the bed or the walls are subject to tampering or theft. Likewise, there has been a problem in providing tool space due to the visible nature of the pickup bed and the limited space in the cab.

There has been provided in the past various devices for under the bed storage of tires. These devices have included frames and clamp devices and other means but there has still long existed a problem for storing a tire in a closed area and providing tool space and a simple means for removing the spare tire in various emergencies that may arise.

By means of this invention there has been provided a greatly improved tire and tool carrier which may be readily mounted under the frame of a truck or other vehicle. The carrier is comprised of a stationary box-like support open at the top which may simply be connected to the frame of the truck. A cover or door is provided at the rear of the box-like support which is hinged to the base which supports the main portion of the tire just beyond the midpoint of the tire. In this fashion when the cover is opened by swinging it downwardly, the tire is visible and can be simply tipped and readily moved from the truck.

The cover has a flat base or floor which when closed, is co-planar with the base of the box-like stationary support which supports the main portion of the tire. The cover is constructed with a vertical wall to which are connected side walls which in the closed position nest with the side walls of the main box-like support. In the closed position the tire will rest on the base of the stationary support and the floor of the hinged cover.

In order to provide for positioning of the tire within the tire and tool carrier in the closed position an arcuate semi-circular upstanding flange is provided as a tire positioning device. This is welded or otherwise affixed to the floor of the cover. Because of the nature of the squared walls of the cover formed by the side walls and rear wall and the semi-circular tire positioning flange a corner space is provided at each of the corners which conveniently serves as a storage space for tools of one type or another. In this fashion, the tire and tool carrier when the cover is closed serves to completely conceal the contained tire and tool to prevent tampering and theft.

The tire and tool carrier is simply provided with latching means to receive a bolt, lock or the like to lock the cover to the stationary support in the closed position. Also to assist in the closing of the cover and overcome the weight thereof, spring biasing means are provided to provide a biasing assist in such closing.

The above features are objects of this invention and further objects will appear in the detailed description which follows and will be otherwise apparent to those skilled in the art.

For the purpose of illustration, there is shown in the accompanying drawings a preferred embodiment thereof. It is to be understood that these drawings are for the purpose of example only and that the invention is not limited thereto.

IN THE DRAWINGS

DESCRIPTION OF THE INVENTION

Figure 1:
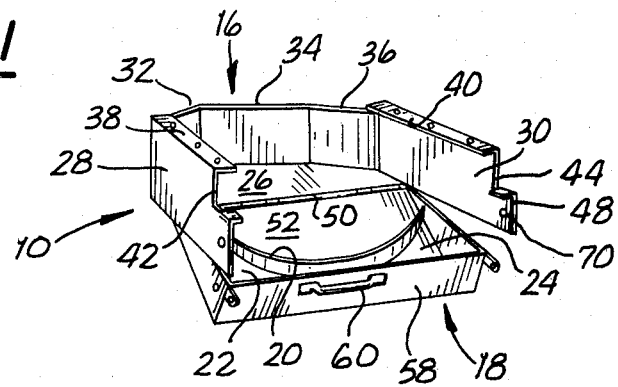
FIG. 1, is a pictorial view showing the tire and tool carrier with the cover partially opened and with the springs removed.
Figure 2:
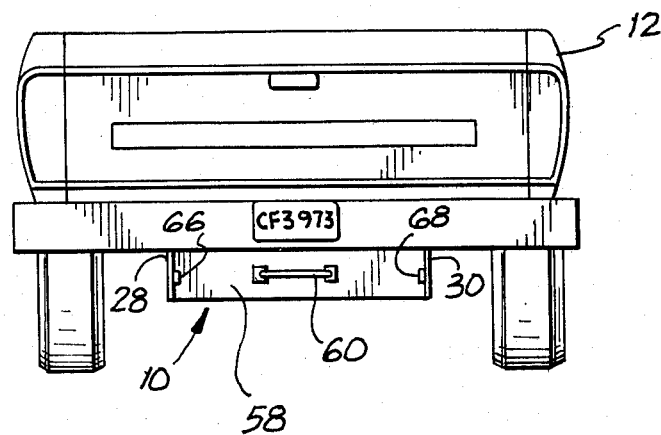
FIG. 2, is a view in rear elevation of a pickup truck equipped with tire and tool carrier.
Figure 3:
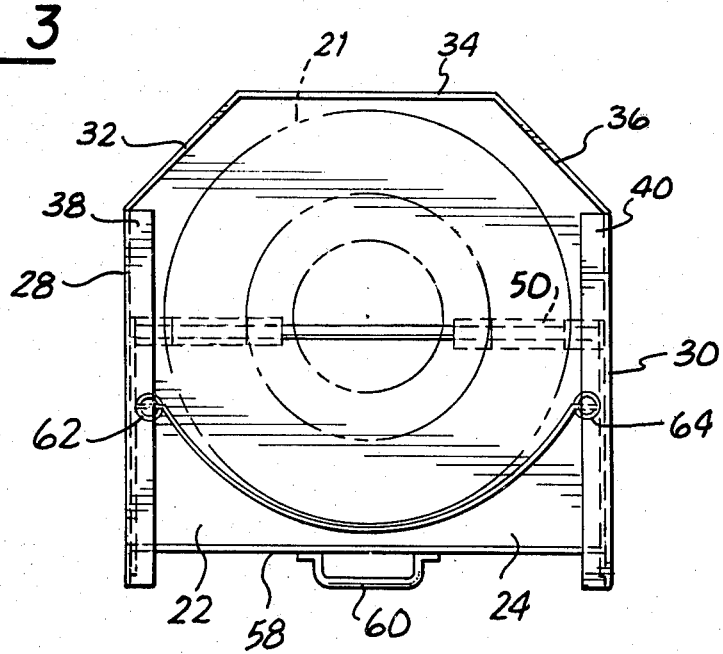
FIG. 3, is a top plan view of the tire and tool carrier in the closed position with a tire shown supported therein.
Figure 4:
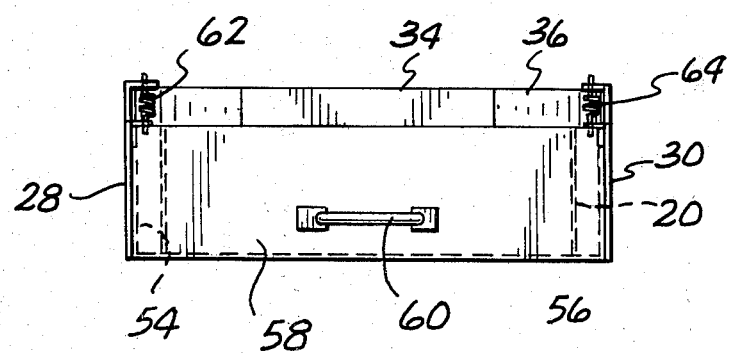
FIG. 4, is a view in rear elevation of the tire and tool carrier.
Figure 5:
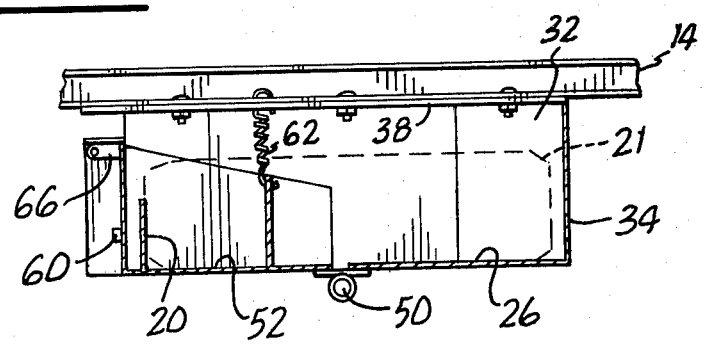
FIG. 5, is a view in longitudinal section through the middle of the tire and tool carrier showing the connection to the truck frame.
Figure 6:
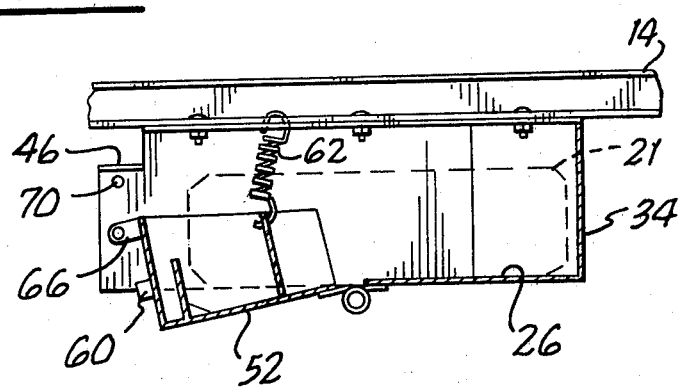
FIG. 6, is a view taken similarly to FIG. 5, but showing the cover opened preparatory to removing the tire.

The tire and tool carrier of this invention is generally identified by the reference numeral 10. As best shown in FIGS. 2, 5 and 6, it is shown supported underneath a truck 12 by connecting it to the frame 14. It is generally comprised of a stationary box-like support section 16 to which is connected a hinged cover or door 18. The cover 18 is provided with a rim-like tire positioner 20 to position a spare tire 21. The positioner also serves to define tool carrying storage spaces 22 and 24 at the corners of the cover.

The main box-like support structure of the tire and tool carrier is comprised of a flat floor or base 26 to which are connected upstanding vertical side walls 28 and 30. A vertical front wall is formed from partitions 32, 34 and 36 to conform generally to the configuration of the tire.

At the top of the side walls 28 and 30 are inwardly turned flanges 38 and 40 which may be provided with bolt holes or the like for affixation of bolts with registering or mating holes in the underside of the frame 14 to connect the tire and tool carrier thereto.

Both of the side walls 28 and 30 of the box-like support have cut out notches 42 and 44 with inwardly turned tabs or flanges 46 and 48. The notches serve to accommodate a step bumper or other bumper where the bumper protrudes under the frame of the truck bed. It will be understood that where the bumper and frame are the same level, the side walls may extend to the rear without these notches. The inwardly flanges 46 and 48 serve as a stop to limit the upward movement of the cover in the closed position and provide for automatic registration of latch holes, to be be further described, for securing the cover to the side walls in the closed position.

The cover 18 is best shown in FIGS. 1, 3, 5 and 6. It is hinged to the floor 26 of the stationary support by hinge 50 which is positioned transversly just beyond the mid-point of the tire which is supported on the floor of the main stationary box-like support. The positioning of the hinge ensures that the spare tire will still be retained by the stationary support after the cover is opened but may be easily tipped and withdrawn as needed.

In order to position the tire within the cover when it is in the closed position, the tire positioner 20 is provided. This is constructed by an upstanding semi-circular flange of generally rim-like construction which may be welded to the floor 52 of the cover.

The cover is further provided with side walls 54 and 56 and rear wall 58. The side walls taper generally from the rear wall to the hinge line in order to conserve material and reduce weight. The corner spaces 22 and 24 are defined in the space provided between the tire positioner 20 and the corners of the cover defined by the side walls 54 and 56 merging with the rear wall 58. The tire positioner 20 is spaced a short distance from the rear wall in order to provide for reception of a long jack which may extend between the side walls and may be fitted within the space between the tire positioner and the rear wall of the cover. Various other tools of one type or another may be stored in the corner storage spaces provided.

The cover is further provided with a handle 60 mounted on the rear wall to raise and lower it from the open and closed positions. To assist in the raising or closing of the cover biasing springs 62 and 64 are connected between the opposite ends of the tire positioner and flanges 38 and 40 of the side walls of the box-like stationary support.

In order to secure the cover in the closed position, tabs 66 and 68 are provided with an eye or opening adapted to register with openings 70 provided in the stationary side walls of the main box-like support for reception of connecting bolts, locks or the like.

USE

The tire and tool carrier of this invention is very simply installed on conventional trucks, vans and other types of vehicle. Affixation is very simply effected by connecting the inwardly extending flanges 38 and 40 of the side walls of the carrier to the underside of the frame of the vehicle. Most frames are provided with holes for spare tire clamps or the like and the holes provided in the tool carrier are designed to be in registry therewith. A simple bolt connection is all that is required. Other conventional means of affixation can be employed as will be readily understood from one frame design to another.

After the tire and tool carrier has been installed, the spare tire 21 is secured in the cover closed position such as shown in FIG. 5. The installation of the tire is effected very simply by opening the cover or door and sliding the tire into the carrier where it is supported in the position generally shown in FIG. 6, since the hinge point of the carrier is located slightly to the rear of the center of the tire when the tire is supported on the floor 26 of the main stationary support. The cover is then simply closed with the springs 62 and 64 facilitating the closure of the cover which is biased upwardly thereby. Once closed, a lock or the like may be inserted through the tabs 66 and 68 and the opening 70 in the side walls to lock the cover to the side walls.

When closed and locked, the tire and tool carrier is maintained in a low profile underneath the vehicle. Various types of tools, jacks or the like may be stored within the corner storage spaces provided at the rear of the tire positioner within the cover.

When the spare tire is desired to be removed, the cover is simple unlatched and opened by moving it downwardly. The weight of the cover countered by the biasing action of the springs makes both the lowering and raising a simple operation. The tire may then simply be withdrawn by slightly tipping it which aids in sliding it down the cover and the withdrawal to the rear. The operator effects the entire operation very simply, since the cover is located at the rear just under the bumper and the tire is thereby readily accessible for removal or installation. In the lowered position of the cover the tools in the storage spaces 22 and 24 are readily accessible to carry out any tire changing operation or other repairs as required.

After the tire changing has been effected, the tire can be re-inserted by sliding it upwardly along the tilted floor cover past the hinge to butt against the front wall portion 34 of the stationary box-like support. The operator then simple grasps the handle 60 of the cover and through the spring assist action of the springs the cover is moved upwardly against the stops 36 and 48 which provide for automatic registration of the eyelets or openings of the registering holes in the side walls of the carrier and the cover tabs. Connecting bolts or locks as desired are then inserted to secure the cover in the closed position.

The tire and tool carrier is extremely rugged and can be simply installed in various types of vehicles in otherwise unused are underneath the frame. The spare tire and tools contained therein are completely hidden from view and in the readily accessible yet secure and tamper-proof carrier. The carrier may be employed and used by vehicle operators with a minimum of inconvenience in access in removing the tire and tools as desired.

Various changes and modifications may be made within this invention as will be readily apparent to those skilled in the art. Such changes and modifications are within the scope and teaching of this invention as defined by the claims appended hereto.

What is claimed is:

1. A tire and tool carrier for vehicles, said carrier comprising a box-like support having means for attaching the support to the underside of said vehicle, said support comprising a stationary base for supporting said tire and cover forming a rear portion of said support having means hingedly connecting it to said base, said cover including a bottom wall hinged to said stationary base at a point to the rear of the mid point of said carrier, said bottom wall being bounded by opposed side walls and an intermediate rear wall and having arcuate upstanding tire positioning flange means defining corner spaces at a junction of each of said side walls with said rear wall for storage of tools and the like.

2. The tire and tool carrier of claim 1, in which said stationary base is provided with a vertical front wall connected to opposed side walls and means are provided for connecting said side walls to a frame of said vehicle.

3. The tire and tool carrier of claim 2, in which said side walls of the stationary base and the side walls of said cover are nestable within one another.

4. The tire and tool carrier of claim 3, in which means are provided for latching the cover to said stationary base in a closed position to enclose the carrier and any tire and tools therein from interference by tampering.

5. The tire and tool carrier of claim 1, in which the hinging of the cover is positioned slightly to the rear of the midpoint between a front wall of the stationary base and said tire positioning flange means in order that when the cover is opened a tire may be supported upon said stationary and readily tipped therefrom for easy removal.

6. The tire and tool carrier of claim 5, in which said stationary base is provided with a vertical front wall connected to opposed side walls and means are provided for connecting said side walls to a frame of said vehicle, said side walls of the stationary base and the side walls of said cover are nestable within one another, means are provided for latching the cover to said stationary base in a closed position to enclose the carrier and any tire and tools therein from interference by tampering and springs means are connected between said cover and said side wall of the stationary base to provide biasing assistance in closing said cover.

7. The tire and tool carrier of claim 2, in which spring means are connected between said cover and said side walls of the stationary base to provide biasing assistance in closing said cover.

* * * * *

UNITED STATES PATENT AND TRADEMARK OFFICE
CERTIFICATE OF CORRECTION

PATENT NO. : 4,228,936
DATED : October 21, 1980
INVENTOR(S) : Orin S. Rife

It is certified that error appears in the above—identified patent and that said Letters Patent is hereby corrected as shown below:

On the Title Page, Item (76) "Elkland, Miss. 65644" should read -- Elkland, Mo. 65644 --.

Signed and Sealed this

Thirteenth Day of January 1981

[SEAL]

Attest:

SIDNEY A. DIAMOND

Attesting Officer

Commissioner of Patents and Trademarks